United States Patent
Dong et al.

(10) Patent No.: US 11,719,935 B2
(45) Date of Patent: Aug. 8, 2023

(54) OPTICAL DISPLAY SYSTEM HAVING OPTICAL WAVEGUIDES FOR GUIDING POLARIZED LIGHTS AND METHOD, AND DISPLAY DEVICE HAVING THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Chenru Wang, Beijing (CN); Yali Liu, Beijing (CN); Ke Li, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 443 days.

(21) Appl. No.: 16/957,589

(22) PCT Filed: Aug. 26, 2019

(86) PCT No.: PCT/CN2019/102594
§ 371 (c)(1),
(2) Date: Jun. 24, 2020

(87) PCT Pub. No.: WO2021/035482
PCT Pub. Date: Mar. 4, 2021

(65) Prior Publication Data
US 2022/0326538 A1 Oct. 13, 2022

(51) Int. Cl.
*G02B 27/01* (2006.01)
*G02B 30/25* (2020.01)
*G02B 27/28* (2006.01)

(52) U.S. Cl.
CPC ........ *G02B 27/0172* (2013.01); *G02B 27/283* (2013.01); *G02B 27/286* (2013.01);
(Continued)

(58) Field of Classification Search
CPC .............. G02B 27/017; G02B 27/0172; G02B 2027/0174; G02B 2027/0127
See application file for complete search history.

(56) References Cited

U.S. PATENT DOCUMENTS

2013/0322810 A1\* 12/2013 Robbins ................ G06T 19/006
385/11
2015/0172632 A1  6/2015 Ramirez Flores et al.
(Continued)

FOREIGN PATENT DOCUMENTS

CN  107024769 A  8/2017
CN  107193078 A  9/2017
(Continued)

OTHER PUBLICATIONS

Extended European Search Report dated Aug. 5, 2022, relating to EP Patent Application No. 19 933 223.0.

*Primary Examiner* — Bao-Luan Q Le
(74) *Attorney, Agent, or Firm* — Dinsmore & Shohl LLP

(57) ABSTRACT

The present disclosure provides an optical display system and method, and a display device. The optical display system includes: a display screen; a light split member configured to split light from the display screen into a first polarized light and a second polarized light with different polarization directions; a first optical waveguide configured to guide the first polarized light to a light exit side of the optical display system; and a second optical waveguide located at a light exit side of the first optical waveguide, spaced apart from the first optical waveguide, and configured to at least partially transmit the first polarized light and (Continued)

guide the second polarized light to the light exit side of the optical display system.

16 Claims, 3 Drawing Sheets

(52) U.S. Cl.
CPC ...... *G02B 30/25* (2020.01); *G02B 2027/0127* (2013.01); *G02B 2027/0134* (2013.01)

(56) References Cited

U.S. PATENT DOCUMENTS

| | | | |
|---|---|---|---|
| 2015/0205126 A1* | 7/2015 | Schowengerdt | H04N 13/344 345/633 |
| 2015/0338660 A1* | 11/2015 | Mukawa | G02B 5/1842 359/13 |
| 2016/0026253 A1* | 1/2016 | Bradski | H04N 13/128 345/8 |
| 2017/0248790 A1* | 8/2017 | Cheng | G02B 27/0172 |
| 2018/0052325 A1* | 2/2018 | Bohn | G02B 26/10 |
| 2018/0052501 A1* | 2/2018 | Jones, Jr. | G02B 27/0018 |
| 2018/0130391 A1* | 5/2018 | Bohn | G02B 27/0172 |
| 2018/0246333 A1* | 8/2018 | Cheng | G02B 6/0055 |
| 2018/0275410 A1* | 9/2018 | Yeoh | G06F 3/013 |
| 2019/0041645 A1 | 2/2019 | Wu | |
| 2020/0081255 A1* | 3/2020 | Schultz | G02B 3/08 |
| 2020/0192007 A1* | 6/2020 | Kwak | G02B 27/0075 |
| 2021/0096453 A1* | 4/2021 | Wheelwright | G02B 17/0856 |

FOREIGN PATENT DOCUMENTS

| | | | | |
|---|---|---|---|---|
| CN | 108873355 A | | 11/2018 | |
| CN | 109239926 A | | 1/2019 | |
| WO | 2017129029 A1 | | 8/2017 | |
| WO | WO-2017129029 A1 | * | 8/2017 | ............ G02B 27/00 |
| WO | 2018156523 A | | 8/2018 | |
| WO | 2019156839 A1 | | 8/2019 | |

* cited by examiner

OPTICAL DISPLAY SYSTEM HAVING OPTICAL WAVEGUIDES FOR GUIDING POLARIZED LIGHTS AND METHOD, AND DISPLAY DEVICE HAVING THE SAME

CROSS-REFERENCE TO RELATED APPLICATIONS

The present application is a U.S. National Stage Application under 35 U.S.C. § 371 of International Patent Application No. PCT/CN2019/102594, filed on Aug. 26, 2018, the disclosure of which is incorporated by reference herein in its entirety.

TECHNICAL FIELD

The present disclosure relates to an optical display system and method, and a display device.

BACKGROUND

Augmented reality (AR) technology is a new technology that integrates information of the real world and information of the virtual world. Information that is difficult to experience in the real world, such as visual information, sound, taste, and tactile sensation, is superimposed on the real world, so that there is an experience beyond reality.

Virtual reality (Virtual Reality, VR) technology is a new technology that transforms data in the real life into phenomena that can be perceived by people and is presented by three-dimensional models.

In the related art, when viewing a 3D screen by using an AR display device or a VR display device for a long time, the viewer may feel tired with eye(s).

SUMMARY

According to one aspect of the embodiments of the present disclosure, an optical display system is provided. The optical display system comprises a display screen; a light split member configured to split light from the display screen into a first polarized light and a second polarized light with different polarization directions; a first optical waveguide configured to guide the first polarized light to a light exit side of the optical display system; and a second optical waveguide located at a light exit side of the first optical waveguide, spaced apart from the first optical waveguide, and configured to at least partially transmit the first polarized light and guide the second polarized light to the light exit side of the optical display system.

In some embodiments, the second optical waveguide comprises: a second optical waveguide body configured to make the second polarized light propagate by total reflection in the second optical waveguide body; and a polarizing member disposed in the second optical waveguide body and configured to at least partially reflect the second polarized light and totally transmit the first polarized light.

In some embodiments, the polarizing member comprises a plurality of polarizing reflective films parallel to and spaced apart from each other, each of the plurality of polarizing reflective films being configured to partially reflect the second polarized light and partially transmit the second polarized light.

In some embodiments, the first optical waveguide comprises: a first optical waveguide body configured to make the first polarized light propagate by total reflection in the first optical waveguide body; and a transflective member disposed in the first optical waveguide body and configured to partially reflect the first polarized light and partially transmit the first polarized light.

In some embodiments, the transflective member comprises a plurality of transflective films parallel to and spaced apart from each other.

In some embodiments, the optical display system further comprises: a first light valve disposed between the light split member and the first optical waveguide and configured to transmit the first polarized light in a case where the display screen displays a distant view screen, and not transmit the first polarized light in a case where the display screen displays a near view screen; and a second light valve disposed between the light split member and the second optical waveguide and configured to transmit the second polarized light in the case where the display screen displays the near view screen, and not transmit the second polarized light in the case where the display screen displays the distant view screen.

In some embodiments, at least one of the first light valve or the second light valve comprises a liquid crystal light valve.

In some embodiments, the optical display system further comprises: a first lens assembly of a first focal length disposed between the light split member and the first optical waveguide; and a second lens assembly of a second focal length different from the first focal length disposed between the light split member and the second optical waveguide.

In some embodiments, the optical display system further comprises: a third lens assembly disposed between the display screen and the light split member; and a fourth lens assembly disposed between the light split member and the second optical waveguide.

In some embodiments, the polarizing member comprises a curved polarizing reflective film configured to totally reflect the second polarized light.

In some embodiments, the optical display system further comprises: a fifth lens assembly disposed between the display screen and the light split member.

In some embodiments, the optical display system further comprises: a lens of variable focal length disposed at a light exit side of the second optical waveguide.

In some embodiments, the lens of variable focal length comprises a liquid crystal lens.

In some embodiments, the light split member comprises: a polarizing reflective sheet configured to split the light from the display screen into the first polarized light and the second polarized light; a first reflective member configured to reflect the first polarized light from the polarizing reflective sheet to the first optical waveguide; and a second reflective member configured to reflect the second polarized light from the polarizing reflective sheet the second optical waveguide.

According to another aspect of the embodiments of the present disclosure, a display device is provided. The display device comprises: the optical display system according to any one of the above embodiments.

According to a further aspect of the embodiments of the present disclosure, an optical display method of the optical display system according to any one of the above embodiments is provided. The method comprises: displaying, by the display screen, a near view screen and a distant view screen alternately; splitting, by the light split member, light from the display screen into a first polarized light and a second polarized light with different polarization directions; guiding, by the first optical waveguide, the first polarized light to a light exit side of the optical display system, in a case where the display screen displays the distant view screen; and guiding, by the second optical waveguide, the second polarized light to the light exit side of the optical display system, in a case where the display screen displays the near view screen.

In some embodiments, the optical display system comprises a first light valve disposed between the light split member and the first optical waveguide, and a second light valve disposed between the light split member and the second optical waveguide; the optical display method further comprises: controlling the first light valve to open to transmit the first polarized light, and the second light valve to close to not transmit the second polarized light, in the case where the display screen displays the distant view screen, and controlling the first light valve to close to not transmit the first polarized light, and the second light valve to open to transmit the second polarized light, in the case where the display screen displays the near view screen.

In some embodiments, the optical display system comprises a lens of variable focal length located at a light exit side of the second optical waveguide; and the optical display method further comprises: adjusting the lens of variable focal length to be of a first focal length to make the first polarized light present a distant view imaging screen with a first virtual image distance after being transmitted to the light exit side of the optical display system via the lens of variable focal length, in the case where the display screen displays the distant view screen, and adjusting the lens of variable focal length to be of a second focal length to make the second polarized light present a near view imaging screen with a second virtual image distance after being transmitted to the light exit side of the optical display system via the lens of variable focal length, in the case where the display screen displays the near view screen, wherein the second focal length is different from the first focal length, and the second virtual image distance is different from the first virtual image distance.

In some embodiments, the optical display system comprises a lens of variable focal length located at a light exit side of the second optical waveguide, the distant view screen comprises a first distant view screen and a second distant view screen that are alternately displayed and correspond to different object distances, and the near view screen comprises a first near view screen and a second near view screen that are alternately displayed and correspond to different object distances; and the optical display method further comprises: adjusting the lens of variable focal length to be of a first focal length to make the first polarized light present a first distant view imaging screen with a first virtual image distance after being transmitted to the light exit side of the optical display system via the lens of variable focal length, in the case where the display screen displays the first distant view screen, adjusting the lens of variable focal length to be of a second focal length to make the first polarized light present a second distant view imaging screen with a second virtual image distance after being transmitted to the light exit side of the optical display system via the lens of variable focal length, in the case where the display screen displays the second distant view screen, wherein the second focal length is different from the first focal length, and the second virtual image distance is different from the first virtual image distance, adjusting the lens of variable focal length to be of a third focal length to make the second polarized light present a first near view imaging screen with a third virtual image distance after being transmitted to the light exit side of the optical display system via the lens of variable focal length, in the case where the display screen displays the first near view screen, and adjusting the lens of variable focal length to be of a fourth focal length to make the second polarized light present a second near view imaging screen with a fourth virtual image distance after being transmitted to the light exit side of the optical display system via the lens of variable focal length, in the case where the display screen displays the second near view screen, wherein the fourth focal length is different from the third focal length, and the fourth virtual image distance is different from the third virtual image distance.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure can be understood more clearly from the following detailed description with reference to the accompanying drawings, in which.

Figure 1:
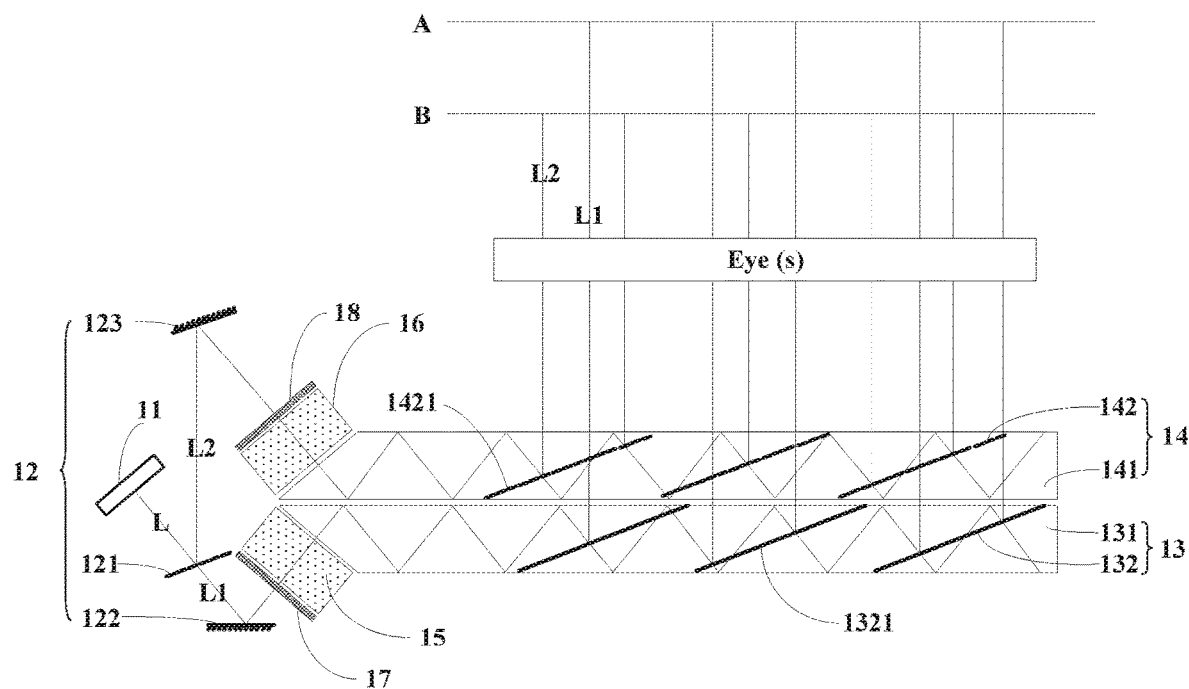
FIG. 1 is a schematic structural view showing an optical display system according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

During a viewing process using an AR or VR display device, the eye(s) of the view adjusts the diopter through the eye(s)' lens to focus the light incident on the eye(s) onto the retina. Since there is a difference in depth between different positions of a stereoscopic object and the retina, the eye(s) need to perform vergence rotation to adapt to the difference in depth. However, in the related art, there is a constant distance between the virtual image plane where the imaging screen is situated and the eye(s), the viewer does not need to perform dioptric adjustment when viewing the imaging screen. In this way, there will be a conflict between the vergence rotation of the eye(s) and the constant dioptric adjustment (that is, vergence conflict), and the viewer is prone to fatigue when viewing the imaging screen on the virtual image plane for a long time.

FIG. 1 is a schematic structural view showing an optical display system according to an embodiment of the present disclosure.

As shown in FIG. 1, the optical display system may comprise a display screen 11, a light split member 12, a first optical waveguide 13 and a second optical waveguide 14.

The display screen 11 is configured to display a screen. For example, the display screen 11 may be a micro organic light emitting diode (Micro-OLED) display or a digital light processing (DLP) display or the like.

The light split member 12 is configured to split light L from the display screen 11 into a first polarized light L1 and a second polarized light L2 with different polarization directions. It should be understood that the light L from the display screen 11 is natural light, which is split into the first polarized light L1 and the second polarized light L2 with different polarization directions after being split by the light split member 12. For example, the first polarized light L1 may be P light, and the second polarized light L2 may be S light. For another example, the first polarized light L1 may be S light, and the second polarized light L2 may be P light.

The first optical waveguide 13 is configured to guide the first polarized light L1 to a light exit side (e.g. an upper side) of the optical display system.

The second optical waveguide 14 is located at the light exit side of the first optical waveguide 13 and spaced apart from the first optical waveguide 13. The second optical waveguide 14 is configured to at least partially transmit the first polarized light L1 and guide the second polarized light L2 to the light exit side (e.g. the upper side) of the optical display system.

Here, the first polarized light L1 after exiting from the first optical waveguide 13 first enters the second optical waveguide 14, and then exits from the second optical waveguide 14 to the light exit side of the optical display system. As shown in FIG. 1, for example, the first polarized light L1 may be focused on the focal plane A after exiting from the second optical waveguide 14, and the second polarized light L2 may be focused on the focal plane B after exiting from the second optical waveguide 14.

It should be understood that the optical power of the first polarized light L1 and the second polarized light L2 may be controlled using a lens assembly, so that the optical display system may position imaging screens at different virtual image planes during imaging with the first polarized light L1 and the second polarized light L2. Here, the virtual image planes are located at the non-light exit side of the optical display system, for example, the lower side of the first optical waveguide 13.

In some implementations, referring to FIG. 1, the optical display system may comprise a first lens assembly 15 of a first focal length and a second lens assembly 16 of a second focal length. Here, the first focal length is different from the second focal length. The first lens assembly 15 is disposed between the light split member 12 and the first optical waveguide 13 and may control the focal power of the first polarized light L1. The second lens assembly 16 is disposed between the light split member 12 and the second optical waveguide 14 and may control the optical power of the second polarized light L2. It should be understood that the embodiments of the present disclosure are not limited to the implementation shown in FIG. 1, and other implementations of the lens assembly will be introduced below in conjunction with different embodiments.

In the above embodiments, the optical display system comprises a first optical waveguide and a second optical waveguide. The first optical waveguide may guide the first polarized light to the light exit side of the optical display system, and the second optical waveguide may at least partially transmit the first polarized light and guide the second polarized light to the light exit side of the optical display system. Such an optical display system can image using the first polarized light and the second polarized light respectively, so that the imaging screens are located at a plurality of virtual image planes.

In some embodiments, referring to FIG. 1, the optical display system may further comprise a first light valve 17 and a second light valve 18. The first light valve 17 is disposed between the light split member 12 and the first optical waveguide 13, for example, between the light split member 12 and the first lens assembly 15. The second light valve 18 is disposed between the light split member 12 and the second optical waveguide 14, for example, between the light split member 12 and the second lens assembly 16.

The first light valve 17 is configured to control whether the first polarized light L1 to enter the first optical waveguide 13. For example, the first light valve 17 is configured to transmit the first polarized light L1 in a case where the display screen 11 displays a distant view screen, and not transmit the first polarized light L1 in a case where the display screen 11 displays a near view screen. The second light valve 18 is configured to control whether the second polarized light L2 to enter the second optical waveguide 14.

For example, the second light valve 18 is configured to transmit the second polarized light L2 in the case where the display screen 11 displays a near view screen, and not transmit the second polarized light L2 in the case where the display screen 11 displays a distant view screen.

The display screen 11 may alternately display a distant view screen and a near view screen at a certain frequency. In the case where the display screen 11 displays a distant view screen, the first polarized light L1 will enter the first optical waveguide 13 (for example, via the first lens assembly 15) after being transmitted through the first light valve 17, and then be guided to the light exit side of the optical display system; while the second polarized light L2 which is blocked by the second light valve 18 cannot enter the second optical waveguide 14. In the case where the display screen 11 displays a near view screen, the second polarized light L2 will (for example, via the second lens assembly 16) enter the second optical waveguide 14 after being transmitted through the second light valve 18, and then be guided to the light exit side of the optical display system; while the first polarized light L1 which is blocked by the first light valve 17 cannot enter the first optical waveguide 13. Therefore, the first polarized light L1 and the second polarized light L2 can image alternately without interfering with each other. It should be understood that, visually, the distance between the distant view screen and the surface of the display screen 11 is greater than the distance between the near view screen and the surface of the display screen 11.

As some implementations, at least one of the first light valve 17 or the second light valve 18 may comprise a liquid crystal light valve. As other implementations, at least one of the first light valve 17 or the second light valve 18 may comprise a micro-electromechanical system (MEMS) light valve. However, the embodiments of the present disclosure are not limited thereto as long as the first light valve 17 and the second light valve 18 can realize the function of blocking light.

It should be understood that in the case of imaging using the first polarized light L1, the first lens assembly 15 may control the distance between the virtual image plane where the imaging screen is located and the eye(s) is larger; in the case of imaging using the second polarized light L2, the second lens assembly 16 may control the distance between the virtual image plane where the imaging screen is located and the eye(s) is smaller. In this way, when the viewer views the imaging screen, the dioptric adjustment and the convergence adjustment are performed simultaneously to reduce the vergence conflict, thereby alleviating the fatigue of the eye(s).

Figure 2:
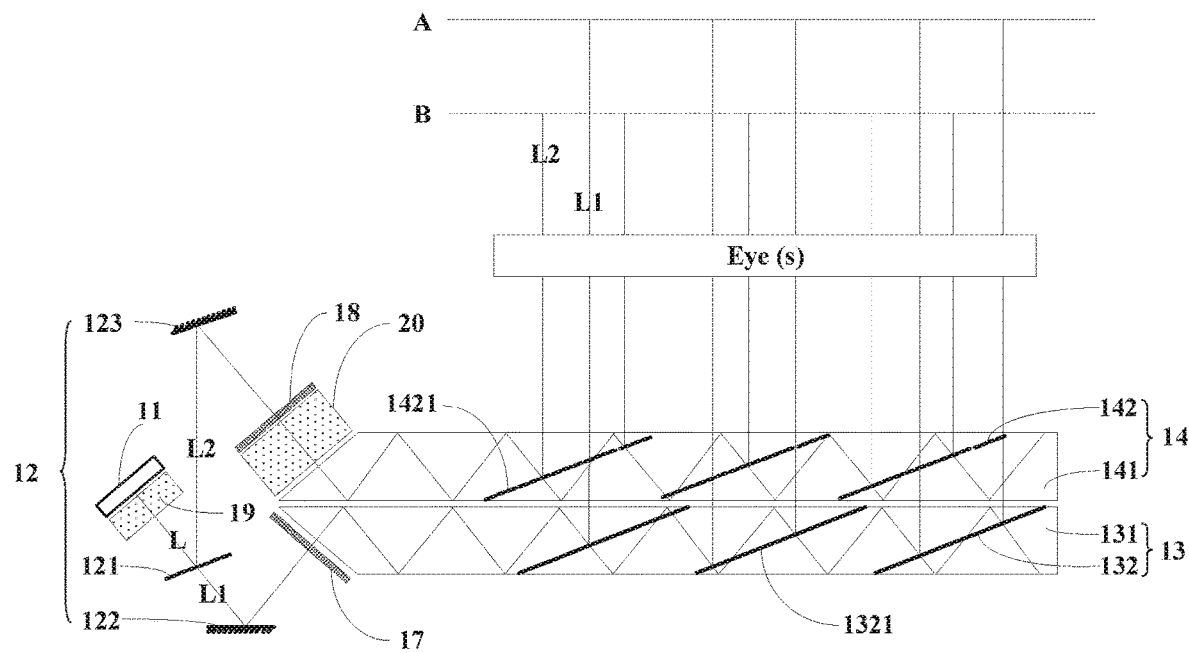
FIG. 2 is a schematic structural view showing an optical display system according to another embodiment of the present disclosure.

FIG. 2 is a schematic structural view showing an optical display system according to another embodiment of the present disclosure.

The optical display system shown in FIG. 2 differs from the optical display system shown in FIG. 1 in that the lens assemblies for controlling the diopters of the first polarized light L1 and the second polarized light L2 are different.

The optical display system shown in FIG. 2 comprises a third lens assembly 19 and a fourth lens assembly 20. The third lens assembly 19 is disposed between the display screen 11 and the light split member 12 and may control the optical power of the first polarized light L1. The fourth lens assembly 20 is disposed between the light split member 12 and the second optical waveguide 14, for example, between the second light valve 18 and the second optical waveguide 14. Both the third lens assembly 19 and the fourth lens assembly 20 may control the optical power of the second polarized light L2.

In some embodiments, referring to FIGS. 1 and 2, the light split member 12 may comprise a polarizing reflection sheet 121, a first reflective member 122 and a second reflective member 123. The first reflective member 122 and the second reflective member 123 may be flat mirrors, for example.

The polarizing reflection sheet 121 is configured to split the light L from the display screen 11 into the first polarized light L1 and the second polarized light L2. The first reflective member 122 is configured to reflect the first polarized light L1 from the polarizing reflection sheet 121 to the first optical waveguide 13. For example, the first polarized light L1 after being reflected by the first reflective member 122 is incident on the first light valve 17 and then is incident on the light incident surface of the first optical waveguide 13. The second reflective member 123 is configured to reflect the second polarized light L2 from the polarizing reflection sheet 121 to the second optical waveguide 14. For example, the second polarized light L2 after being reflected by the second reflective member 123 is incident on the second light valve 18, and then is incident on the light incident surface of the second optical waveguide 14.

In some embodiments, referring to FIGS. 1 and 2, the first optical waveguide 13 may comprise a first optical waveguide body 131 and a transflective member 132 disposed in the first optical waveguide body 131. The first optical waveguide body 131 is configured to make the first polarized light L1 propagate by totally reflection in the first optical waveguide body 131. The transflective member 132 is configured to partially reflect the first polarized light L1 and partially transmit the first polarized light L1.

For example, the transflective member 132 may comprise a plurality of transflective films 1321 that are parallel to and spaced apart from each other. A part of the first polarized light L1 incident on the transflective film 1321 is reflected to the light exit side of the first optical waveguide 13, and a part of the first polarized light L1 incident on the transflective film 1321 continues to propagate by total reflection in the first optical waveguide body 131 after being transmitted by the transflective film 1321.

In some embodiments, referring to FIGS. 1 and 2, the second optical waveguide 14 may comprise a second optical waveguide body 141 and a polarizing member 142 disposed in the second optical waveguide body 141. The second optical waveguide body 141 is configured to make the second polarized light L2 propagate by total reflection in the second optical waveguide body 141. The polarizing member 142 is configured to at least partially reflect the second polarized light L2 and totally transmit the first polarized light L1. In this case, the first polarized light L1 exiting from the first optical waveguide 13 may be totally transmitted through the second optical waveguide 14. The first polarized light L1, on one hand, will not lose, and on the other hand, will not mix with the second polarized light L2 to avoid imaging crosstalk.

The polarizing member 142 may be implemented in different implementations. In some implementations, as shown in FIGS. 1 and 2, the polarizing member 142 may comprise a plurality of polarizing reflective films 1421 that are parallel to and spaced apart from each other. Each polarizing reflective film 1421 is configured to partially reflect the second polarized light L2 and partially transmit the second polarized light L2. It should be understood that the polarizing reflective film 1421 may comprise a multi-layer film. The reflectance of the polarizing reflective film 1421 over the second polarized light L2 may be adjusted by adjusting parameters such as the material and thickness of the multilayer film.

The plurality of transflective films 1321 and the plurality of polarizing reflective films 1421 will make a wider distribution range of the first polarized light L1 and the second polarized light L2. In this way, the light with a greater distribution angle will be received by the eye(s), which is more favorable for the viewer to view the imaging screen.

In other implementations, the polarizing member 142 may be implemented in other implementations, which will be described in conjunction with the embodiment shown in FIG. 3.

Figure 3:
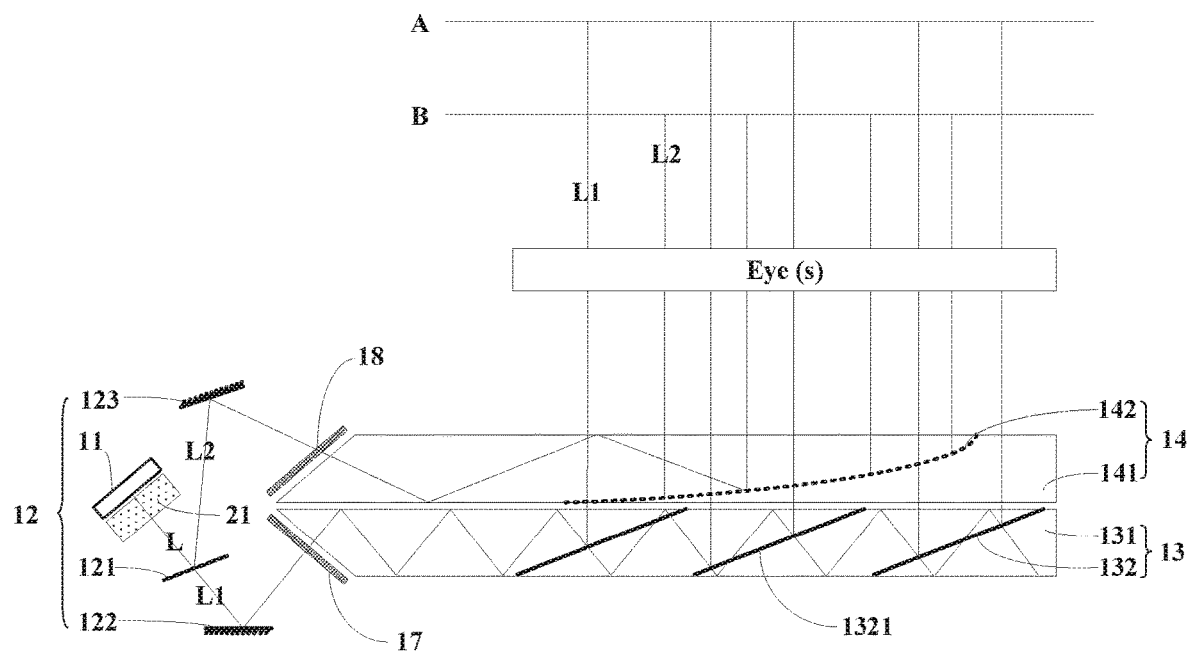
FIG. 3 is a schematic structural view showing an optical display system according to a further embodiment of the present disclosure.

FIG. 3 is a schematic structural view showing an optical display system according to a further embodiment of the present disclosure.

In the optical display system shown in FIG. 3, the polarizing member 142 comprises a curved polarizing reflective film. The curved polarizing reflection film is configured to totally reflect the second polarized light L2.

In addition, the optical display system shown in FIG. 3 may comprise a fifth lens assembly 21 disposed between the display screen 11 and the light split member 12. The fifth lens assembly 21 may control the optical power of the first polarized light L1, and both the fifth lens assembly 21 and the polarizing member 142 may control the optical power of the second polarized light L2.

In some embodiments, the optical display system may further comprise a lens of variable focal length disposed at the light exit side of the second optical waveguide 14. For example, the optical display systems shown in FIGS. 1-3 may additionally comprise a lens of variable focal length. Next, description will be made in conjunction with the embodiment shown in FIG. 4.

Figure 4:
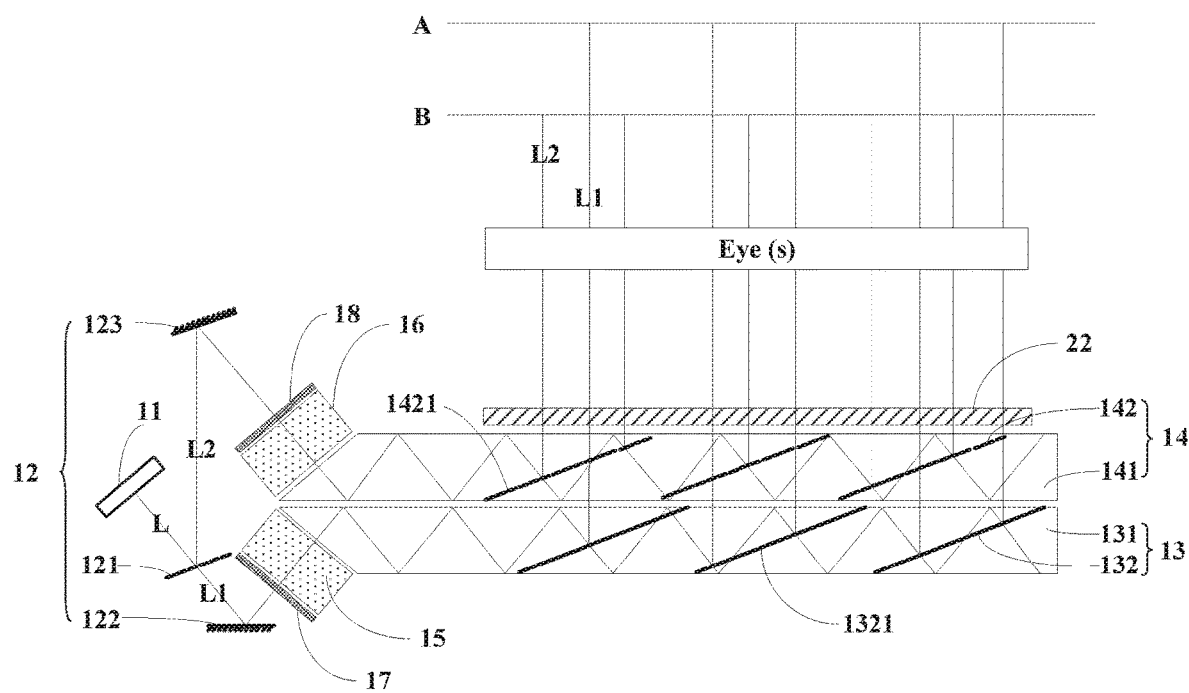
FIG. 4 is a schematic structural view showing an optical display system according to still another embodiment of the present disclosure.

FIG. 4 is a schematic structural view showing an optical display system according to still another embodiment of the present disclosure.

Compared to the optical display system shown in FIG. 1, the optical display system shown in FIG. 4 further comprises a lens of variable focal length 22. As some examples, the lens of variable focal length may comprise, but is not limited to, a liquid crystal lens. For example, the focal length of the liquid crystal lens may be changed by controlling the distribution condition of liquid crystal molecules in the liquid crystal lens.

In the optical display system of the above embodiments, both the first lens assembly 15 and the lens of variable focal length 22 may control the optical power of the first polarized light L1, and both the second lens assembly 16 and the lens of variable focal length 22 may control the optical power of the second polarized light L2.

It should be understood that, since the focal length of the lens of variable focal length 22 is adjustable, the optical display system may position the imaging screens at two or more virtual image planes. It should also be understood that the optical display system shown in FIG. 4 may also not comprise the first lens assembly 15 and the second lens assembly 16 but comprise the lens of variable focal length 22.

The optical display systems provided by the embodiments of the present disclosure may be applied to a display device, such as an AR or VR display device. In the embodiments of the present disclosure, a display device is also provided. The display device comprises the optical display system of any one of the above embodiments.

In the display device, light field display may be realized using only one display screen, which reduces the power consumption of the display device.

In the embodiments of the present disclosure, an optical display method of an optical display system based on any one of the above embodiments.

Figure 5:
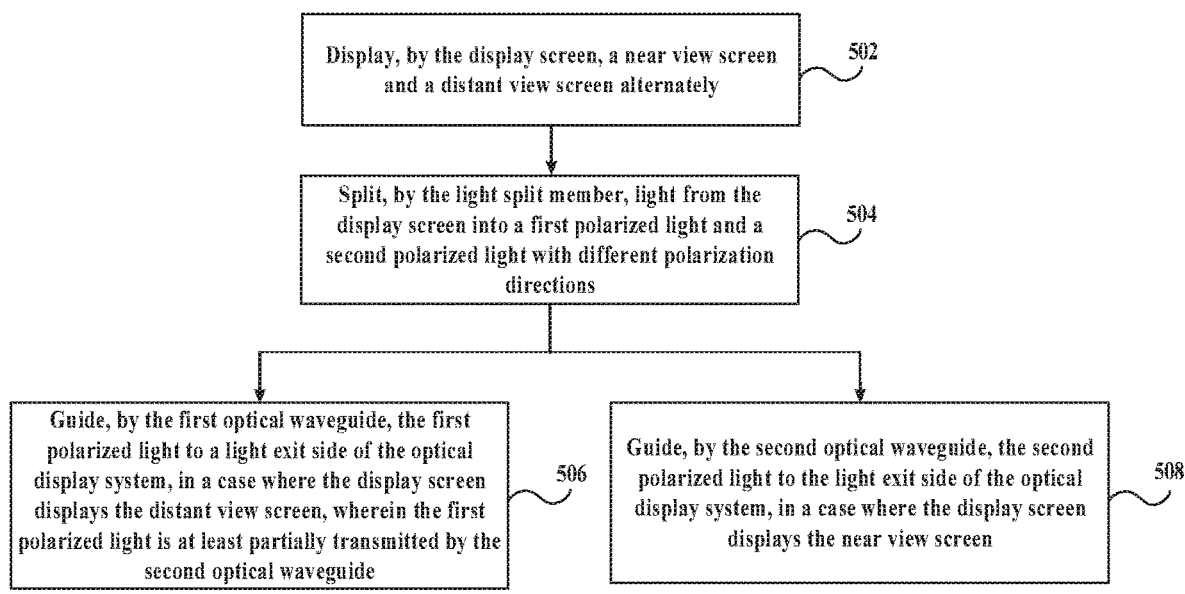
FIG. 5 is a schematic flowchart showing an optical display method according to an embodiment of the present disclosure.

FIG. 5 is a schematic flowchart showing an optical display method according to an embodiment of the present disclosure.

At step 502, a near view screen and a distant view screen are alternately displayed by the display screen.

As some examples, referring to FIGS. 1 to 4, the frequency at which the display screen 11 alternately displays a distant view screen and a near view screen may be greater than or equal to 100 Hz. In this case, the eye(s) will continuously receive imaging screens located at different virtual image planes.

At step 504, light from the display screen is split into a first polarized light and a second polarized light having different polarization directions by the light split member.

At step 506, the first polarized light is guided to a light exit side of the optical display system by the first optical waveguide guide, in a case where the display screen displays the distant view screen.

At step 508, the second polarized light is guided to a light exit side of the optical display system by the second optical waveguide guide, in a case where the display screen displays the near view screen.

In the above embodiments, in the case where the display screen displays a distant view screen, imaging may be performed using the first polarized light; in the case where the display screen displays a near view screen, imaging may be performed using the second polarized light. In this way, by controlling the optical powers of the first polarized light and the second polarized light, the imaging screen may be located at a plurality of virtual image planes.

In some embodiments, the optical display system may comprise a first light valve 17 and a second light valve 18, as shown in FIGS. 1-4. The first light valve 17 is disposed between the light split member 12 and the first optical waveguide 13, and the second light valve 18 is disposed between the light split member 12 and the second optical waveguide 14. In the case where the display screen 11 displays the distant view screen, the first light valve 17 is controlled to open to transmit the first polarized light L1, and the second light valve 18 is controlled to close to not transmit the second polarized light L2. In the case where the display screen 11 displays the near view screen, the first light valve 17 is controlled to close to not transmit the first polarized light L1, and the second light valve 18 is controlled to open to transmit the second polarized light L2.

In some embodiments, the optical display system may comprise a lens of variable focal length 22 located at the light exit side of the second optical waveguide 14 as shown in FIG. 4.

In some implementations, by adjusting the focal length of the lens of variable focal length 22, the optical display system may present a distant view screen and a near view screen with different virtual image distances.

For example, in the case where the display screen 11 displays a distant view, the lens of variable focal length 22 may be adjusted to be of a first focal length to make the first polarized light L1 present a distant view imaging screen with a first virtual image distance after being transmitted to the light exit side of the optical display system via the lens of variable focal length 22.

For example, in the case where the display screen 11 displays a near view screen, the lens of variable focal length 22 may be adjusted to be of a second focal length to make the second polarized light present a near view imaging screen with a second virtual image distance after being transmitted to the light exit side of the optical display system via the lens. Here, the second focal length is different from the first focal length, and the second virtual image distance is different from the first virtual image distance.

In other implementations, by adjusting the focal length of the lens of variable focal length 22, the optical display system may present a plurality of distant view imaging screens with different virtual image distances and a plurality of near view imaging screens with different virtual image distances. In this case, the distant view screen displayed by the display screen 11 may comprise a first distant view screen and a second distant view screen that are alternately displayed and correspond to different object distances, and the near view screen displayed by the display screen 11 may comprise a first near view screen and a second near view screen that are alternately displayed and correspond to different object distances. It should be understood that, visually, the distance between the first distant view screen and the surface of the display screen 11 is different from the distance between the second distant view screen and the surface of the display screen 11, and the distance between the first near view screen and the surface of the display screen 11 is different from the distance between the second near view screen and the surface of the display screen 11.

In a case where the display screen 11 displays the first distant view screen, the lens of variable focal length 22 may be adjusted to of a first focal length to make the first polarized light L1 present a first distant view imaging screen with a first virtual image distance after being transmitted to the light exit side of the optical display system via the lens of variable focal length 22.

In a case where the display screen 11 displays the second distant view screen, the lens of variable focal length 22 may be adjusted to be of a second focal length to make the first polarized light L1 present a second distant view imaging screen with a second virtual image distance after being transmitted to the light exit side of the optical display system via the lens. Here, the second focal length is different from the first focal length, and the second virtual image distance is different from the first virtual image distance.

In a case where the display screen 11 displays the first near view screen, the lens of variable focal length 22 may be adjusted to be of a third focal length make the second polarized light L2 present a first near view imaging screen with a third virtual image distance after being transmitted to the light exit side of the optical display system via the lens of variable focal length 22.

In the case where the display screen 11 displays the second near view screen, the lens of variable focal length 22 may be adjusted to be of a fourth focal length make the second polarized light L2 present a second near view imaging screen with a fourth virtual image distance after being transmitted to the light exit side of the optical display system via the lens of variable focal length 22. Here, the fourth focal length is different from the third focal length, and the fourth virtual image distance is different from the third virtual image distance. It should be understood that each of the fourth virtual image distance and the third virtual image distance is smaller than each of the second virtual image distance and the first virtual image distance.

It should be understood that, the display screen 11 may time-sharing display two or more distant view screens and two or more near view screens. By adjusting the focal length of the lens of variable focal length 22, the optical display system may present two or more distant view imaging screens with different virtual image distances and two or more two near view imaging screens with different virtual image distances.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. An optical display system, comprising:
    a display screen;
    a light split member configured to split light from the display screen into a first polarized light and a second polarized light with different polarization directions;
    a first optical waveguide configured to guide the first polarized light to a light exit side of the optical display system;
    a second optical waveguide located at a light exit side of the first optical waveguide, spaced apart from the first optical waveguide, and configured to at least partially transmit the first polarized light and guide the second polarized light to the light exit side of the optical display system, comprising:
        a second optical waveguide body configured to make the second polarized light propagate by total reflection in the second optical waveguide body, and
        a polarizing member disposed in the second optical waveguide body and comprising a curved polarizing reflective film configured to totally reflect the second polarized light and totally transmit the first polarized light and
    a fifth lens assembly disposed between the display screen and the light split member,
    wherein the fifth lens assembly is configured to control an optical power of the first polarized light, and the fifth lens assembly and the polarizing member are configured to control an optical power of the second polarized light, so that imaging screens during imaging with the first polarized light and the second polarized light respectively by the optical display system are at different virtual image planes.

2. The optical display system according to claim 1, wherein the first optical waveguide comprises:
    a first optical waveguide body configured to make the first polarized light propagate by total reflection in the first optical waveguide body; and
    a transflective member disposed in the first optical waveguide body and configured to partially reflect the first polarized light and partially transmit the first polarized light.

3. The optical display system according to claim 2, wherein the transflective member comprises a plurality of transflective films parallel to and spaced apart from each other.

4. The optical display system according to claim 1, further comprising:
a first light valve disposed between the light split member and the first optical waveguide and configured to transmit the first polarized light in a case where the display screen displays a distant view screen, and not transmit the first polarized light in a case where the display screen displays a near view screen; and
a second light valve disposed between the light split member and the second optical waveguide and configured to transmit the second polarized light in the case where the display screen displays the near view screen, and not transmit the second polarized light in the case where the display screen displays the distant view screen.

5. The optical display system according to claim 4, wherein at least one of the first light valve or the second light valve comprises a liquid crystal light valve.

6. The optical display system according to claim 1, further comprising:
a first lens assembly of a first focal length disposed between the light split member and the first optical waveguide; and
a second lens assembly of a second focal length different from the first focal length disposed between the light split member and the second optical waveguide.

7. The optical display system according to claim 1, further comprising:
a fourth lens assembly disposed between the light split member and the second optical waveguide.

8. The optical display system according to claim 1, further comprising:
a lens of variable focal length disposed at a light exit side of the second optical waveguide.

9. The optical display system according to claim 8, wherein the lens of variable focal length comprises a liquid crystal lens.

10. The optical display system according to claim 1, wherein the light split member comprises:
a polarizing reflective sheet configured to split the light from the display screen into the first polarized light and the second polarized light;
a first reflective member configured to reflect the first polarized light from the polarizing reflective sheet to the first optical waveguide; and
a second reflective member configured to reflect the second polarized light from the polarizing reflective sheet the second optical waveguide.

11. A display device, comprising: the optical display system according to claim 1.

12. An optical display method of an optical display system comprising a display screen, a light split member, a first optical waveguide, a second optical waveguide located at a light exit side of the first optical waveguide and spaced apart from the first optical waveguide, and a fifth lens assembly disposed between the display screen and the light split member, the second optical waveguide comprising a second optical waveguide body and a polarizing member comprising a curved polarizing reflective film, the optical display method comprising:
displaying, by the display screen, a near view screen and a distant view screen alternately;
splitting, by the light split member, light from the display screen into a first polarized light and a second polarized light with different polarization directions;
guiding, by the first optical waveguide, the first polarized light to a light exit side of the optical display system, in a case where the display screen displays the distant view screen, wherein the first polarized light is totally transmitted by the curved polarizing reflective film of the second optical waveguide; and
guiding, by the second optical waveguide, the second polarized light to the light exit side of the optical display system, in a case where the display screen displays the near view screen, wherein the second polarized light propagates by total reflection in the second optical waveguide body, and the second polarized light is totally reflected by the curved polarizing reflective film,
wherein an optical power of the first polarized light is controlled by the fifth lens assembly, and an optical power of the second polarized light is controlled by the fifth lens assembly and the polarizing member, so that imaging screens during imaging with the first polarized light and the second polarized light respectively by the optical display system are at different virtual image planes.

13. The optical display method according to claim 12, wherein:
the optical display system comprises a first light valve disposed between the light split member and the first optical waveguide, and a second light valve disposed between the light split member and the second optical waveguide; and
the optical display method further comprises:
controlling the first light valve to open to transmit the first polarized light, and the second light valve to close to not transmit the second polarized light, in the case where the display screen displays the distant view screen, and
controlling the first light valve to close to not transmit the first polarized light, and the second light valve to open to transmit the second polarized light, in the case where the display screen displays the near view screen.

14. The optical display method according to claim 12, wherein:
the optical display system comprises a lens of variable focal length located at a light exit side of the second optical waveguide; and
the optical display method further comprises:
adjusting the lens of variable focal length to be of a first focal length to make the first polarized light present a distant view imaging screen with a first virtual image distance after being transmitted to the light exit side of the optical display system via the lens of variable focal length, in the case where the display screen displays the distant view screen, and
adjusting the lens of variable focal length to be of a second focal length to make the second polarized light present a near view imaging screen with a second virtual image distance after being transmitted to the light exit side of the optical display system via the lens of variable focal length, in the case where the display screen displays the near view screen, wherein the second focal length is different from the first focal length, and the second virtual image distance is different from the first virtual image distance.

15. The optical display method according to claim 12, wherein:
the optical display system comprises a lens of variable focal length located at a light exit side of the second optical waveguide, the distant view screen comprises a first distant view screen and a second distant view screen that are alternately displayed and correspond to different object distances, and the near view screen comprises a first near view screen and a second near view screen that are alternately displayed and correspond to different object distances; and
the optical display method further comprises:
adjusting the lens of variable focal length to be of a first focal length to make the first polarized light present a first distant view imaging screen with a first virtual image distance after being transmitted to the light exit side of the optical display system via the lens of variable focal length, in the case where the display screen displays the first distant view screen,
adjusting the lens of variable focal length to be of a second focal length to make the first polarized light present a second distant view imaging screen with a second virtual image distance after being transmitted to the light exit side of the optical display system via the lens of variable focal length, in the case where the display screen displays the second distant view screen, wherein the second focal length is different from the first focal length, and the second virtual image distance is different from the first virtual image distance,
adjusting the lens of variable focal length to be of a third focal length to make the second polarized light present a first near view imaging screen with a third virtual image distance after being transmitted to the light exit side of the optical display system via the lens of variable focal length, in the case where the display screen displays the first near view screen, and
adjusting the lens of variable focal length to be of a fourth focal length to make the second polarized light present a second near view imaging screen with a fourth virtual image distance after being transmitted to the light exit side of the optical display system via the lens of variable focal length, in the case where the display screen displays the second near view screen, wherein the fourth focal length is different from the third focal length, and the fourth virtual image distance is different from the third virtual image distance.

16. An optical display system, comprising:
a display screen;
a light split member configured to split light from the display screen into a first polarized light and a second polarized light with different polarization directions;
a first optical waveguide configured to guide the first polarized light to a light exit side of the optical display system, comprising:
a first optical waveguide body configured to make the first polarized light propagate by total reflection in the first optical waveguide body, and
a transflective member disposed in the first optical waveguide body and configured to partially reflect the first polarized light and partially transmit the first polarized light;
a second optical waveguide located at a light exit side of the first optical waveguide, spaced apart from the first optical waveguide, and configured to at least partially transmit the first polarized light and guide the second polarized light to the light exit side of the optical display system, comprising:
a second optical waveguide body configured to make the second polarized light propagate by total reflection in the second optical waveguide body, and
a polarizing member disposed in the second optical waveguide body and comprising a curved polarizing reflective film configured to totally reflect the second polarized light and totally transmit the first polarized light;
a fifth lens assembly disposed between the display screen and the light split member;
a first light valve disposed between the light split member and the first optical waveguide and configured to transmit the first polarized light in a case where the display screen displays a distant view screen, and not transmit the first polarized light in a case where the display screen displays a near view screen; and
a second light valve disposed between the light split member and the second optical waveguide and configured to transmit the second polarized light in the case where the display screen displays the near view screen, and not transmit the second polarized light in the case where the display screen displays the distant view screen,
wherein the fifth lens assembly is configured to control an optical power of the first polarized light, and the fifth lens assembly and the polarizing member are configured to control an optical power of the second polarized light, so that imaging screens during imaging with the first polarized light and the second polarized light respectively by the optical display system are at different virtual image planes.

* * * * *